United States Patent [19]

Mizoguchi et al.

[11] Patent Number: 5,679,808

[45] Date of Patent: Oct. 21, 1997

[54] TERTIARY NON-LINEAR OPTICAL MATERIAL

[75] Inventors: Akira Mizoguchi; Yasuhiro Hattori; Michiru Kubata, all of Osaka, Japan

[73] Assignee: Sumitomo Electric Industries, Ltd., Osaka, Japan

[21] Appl. No.: 307,707

[22] PCT Filed: Feb. 4, 1994

[86] PCT No.: PCT/JP94/00177

§ 371 Date: Jan. 26, 1995

§ 102(e) Date: Jan. 26, 1995

[87] PCT Pub. No.: WO94/18601

PCT Pub. Date: Aug. 18, 1994

[30] Foreign Application Priority Data

Feb. 5, 1993 [JP] Japan .................. 5-019012

[51] Int. Cl.[6] .............. C07C 50/24; C07C 40/703; C07C 50/00
[52] U.S. Cl. .............. 552/223; 552/234; 552/236; 552/238; 552/239; 552/243; 552/258; 552/261; 552/297; 552/298; 552/295; 552/300
[58] Field of Search .............. 552/258, 297, 552/298, 295, 300, 223, 234, 236, 238, 243, 251, 239

[56] References Cited

U.S. PATENT DOCUMENTS

| | | | |
|---|---|---|---|
| 2,321,767 | 6/1943 | Ogilvie ........................ | 552/258 |
| 3,960,751 | 6/1976 | Moriyama et al. ............ | 252/299 |
| 4,363,743 | 12/1982 | Moeller et al. ............... | 252/299.1 |
| 4,405,211 | 9/1983 | Harrison et al. ............. | 350/349 |
| 4,464,282 | 8/1984 | Harrison et al. ............. | 252/299.1 |
| 5,409,797 | 4/1995 | Hosoi et al. ................. | 430/138 |

FOREIGN PATENT DOCUMENTS

| | | |
|---|---|---|
| 63-291039 | 11/1988 | Japan . |
| 2-27 | 1/1990 | Japan . |
| 2-63025 | 3/1990 | Japan . |
| 13331228 | 9/1973 | United Kingdom . |

OTHER PUBLICATIONS

Database Inspec Inspec No. 5030995, Matsuoka M. et al "Molecular design of quinoid dyes for 3rd order NLO materials".

European Search Report.

Primary Examiner—C. Warren Ivy
Assistant Examiner—Raymond Covington
Attorney, Agent, or Firm—Beveridge, DeGrandi, Weilacher & Young L.L.P.

[57] ABSTRACT

The present invention discloses a tertiary non-linear optical material comprising a quinone derivative expressed by any one of the general formulas:

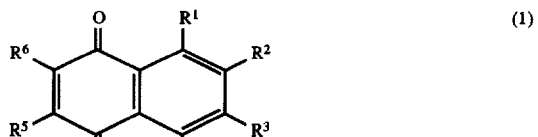

(1)

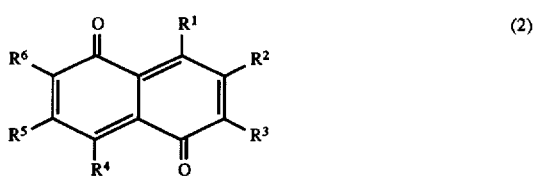

(2)

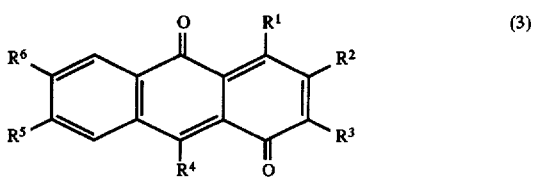

(3)

wherein $R^1$, $R^2$, $R^3$, $R^4$, $R^5$ and $R^6$ are as defined above, or the formula:

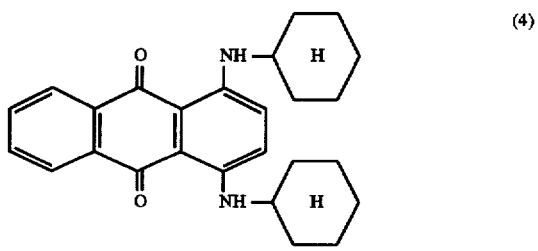

(4)

The tertiary non-linear material enables the co-existence of large tertiary non-linear optical susceptibility and high-speed response.

7 Claims, 2 Drawing Sheets

F I G. 1
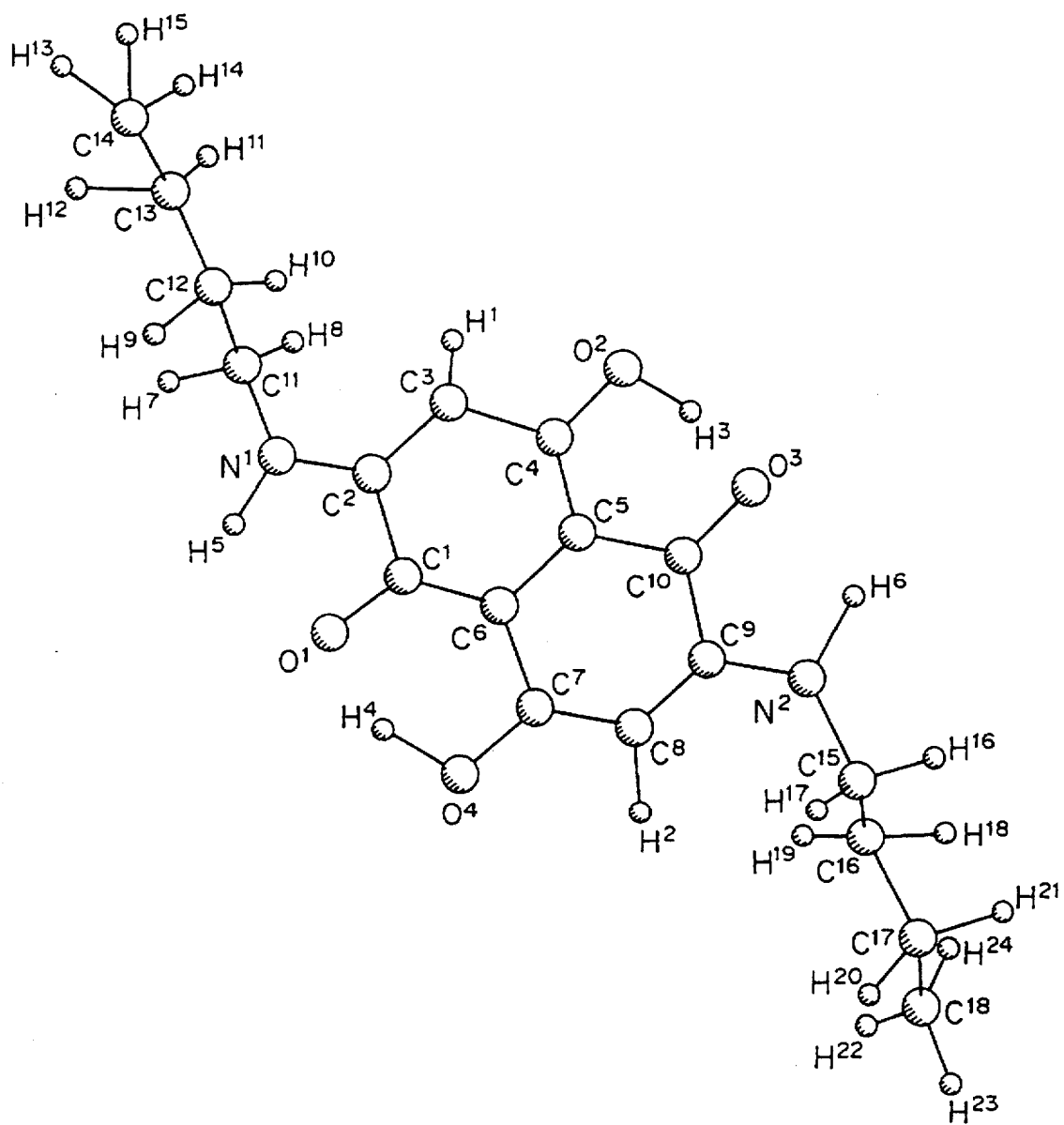

TERTIARY NON-LINEAR OPTICAL MATERIAL

TECHNICAL FIELD

This is the U.S. material phase of PCT/JP94/00177 filed Feb. 4, 1994.

The present invention relates to a novel organic non-linear optical material for manufacturing various devices using non-linear optical effects. More particularly, it relates to a tertiary non-linear optical material preferably employed in various devices used in the fields of super-high speed optical information processing or optical communication using tertiary non-linear optical effects.

BACKGROUND ART

The non-linear optical effect is, as expressed by the following equation (i), an optical effect that generates along with non-linearity occurred if a polarization P, which is induced by an electric field exerted within a crystal, is provided with second degree or higher degree terms.

$$P = X^{(1)}E + X^{(2)}E \cdot E + X^{(3)}E \cdot E \cdot E + \ldots X^{(n)}E^n \qquad (i)$$

wherein $X^{(n)}$ is a non-linear sensitivity rate of n-th degree, and E is an electric field vector.

As a secondary non-linear optical phenomenon observed on the non-linear optical material, there are second harmonic generation, optical rectification, optical mixing, parametric amplification, Pockels effect and the like. As the tertiary non-linear optical phenomenon, there are third harmonic generation, optical bistability, Kerr effect and the like.

If the optical bistability is employed as a tertiary optical phenomenon, it is possible to obtain a device which can be a key device for the future optical information processing systems such as a high-speed light switch and an optical bistable device. Accordingly, research and development of non-linear optical materials has recently been prevalent.

As a non-linear optical material showing optical bistability, there are known a semi-conductor with multiple-quantum well structure, a glass material wherein super-fine particles of semi-conductors (e.g. CuCl, CdS) are dispersed, an organic compound with π-electron conjugated system, among others [e.g. see Solid State Physics "Special Issue of Non-linear Optics", 24, (11), 1989].

Among those, the semi-conductors and the glass material, both of which employ non-linear optical effect due to optical absorption, exhibit a speed of response ranging from $10^{-8}$ to $10^{-11}$ seconds, which is too slow to use as a device for super-high speed information processing.

On the other hand, the organic compound utilizes non-linear optical effect due to pure electronic polarization, not due to optical absorption nor molecular rearrangement. Therefore, it exhibits a high speed of response ranging from $10^{-12}$ to $10^{-14}$ seconds, thus being a prospective material of a device used for super-high speed information processing.

As an organic compound with the tertiary non-linear optical effect, there are known a polymer material such as polydiacetylene, polyacetylene, polybenzothiazole; a low molecular weight compound with inner-molecular charge transfer structure such as an azo pigment; a transition-metal complex such as a metallic phthalocyanine, among others.

However, a tertiary non-linear susceptibility $X^{(3)}$ for the known organic compounds with π-electron conjugate system is located in smaller values, i.e. in a range from $10^{-9}$ to $10^{-11}$ esu, so that a strong input optical intensity is required to operate a formed device. It is therefore impossible to employ a semi-conductor laser with about 10 mW as a light source, thus being unsuitable for practical use.

Meanwhile, there are no definite molecular design guide-line for increasing the tertiary non-linear susceptibility $X^{(3)}$ in the organic compounds.

It is an object of the present invention to provide a tertiary non-linear optical material which enables the co-existence of large tertiary non-linear optical susceptibility and high speed of response.

DISCLOSURE OF THE INVENTION

The tertiary non-linear optical material of the present invention is a quinone derivative expressed by any one of the general formulas:

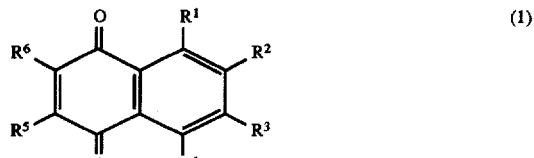

(1)

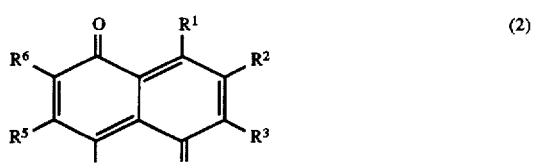

(2)

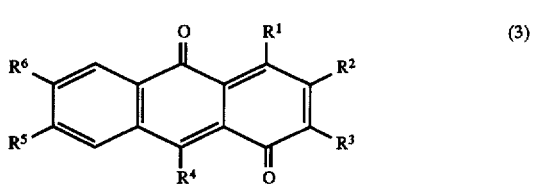

(3)

wherein $R^1$ is an electron-donating group; $R^2$, $R^3$, $R^4$, $R^5$ and $R^6$ are the same or different, and are hydrogen atoms or organic substituents containing the electron-donating group, or the formula:

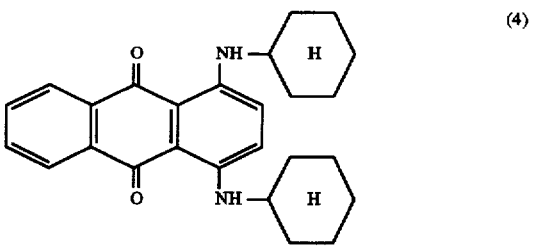

(4)

The inventors studies the organic compounds with π-electron conjugated system that essentially have a high speed of response, in order to improve its tertiary non-linear susceptibility.

Organic compounds usually form a molecular crystal of which molecules are bonded together by a weak van der Waals force. In order to develop a material with a larger tertiary optical effect, it is necessary to detect a molecule with large tertiary molecular super-polarizability γ in the following equation (ii) representing a molecular polarization μ at each molecular level.

$$\mu = \alpha E + \beta E \cdot E + \gamma E \cdot E \cdot E + \ldots \qquad (ii)$$

wherein α is a polarizability; "β, γ, . . . " respectively indicates secondary, tertiary, . . . molecular super-polarizability; and E is an electric field vector.

In order to increase the tertiary molecular super-polarizability γ, there may constitute an inner-molecular charge transfer structure wherein in a conjugate π electron skeleton, an electron-donating group is substituted with an electron-accepting group. It is known that a compound with inner-molecular charge transfer structure has a larger tertiary molecular super-polarizability γ in comparison with a compound that does not have such a structure [J.L. Oudar et al., J. Chem. Phys.,66, 2664 (1977); ibid, 67, 1626 (1978)].

Every quinone derivative expressed by the general formulas (1) to (3) or the formula (4) has essentially high speed of response owing to the possession of the π-electron conjugated system, and exhibits a larger tertiary molecular super-polarizability γ because it has the so-called inner-molecular charge transfer structure wherein a predetermined location of naphthoquinone or an anthraquinone skeleton, each having a carbonyl group as an electron-accepting group, is substituted with an electron-donating group.

The tertiary non-linear optical materials comprising the respective quinone derivative realize the co-existence of large tertiary non-linear susceptibility and high speed of response by selecting a substituent for substituting the respective location of the naphthoquinone or the anthraquinone skeleton.

In the tertiary non-linear optical materials of the present invention, it is desirable that in the quinone derivatives expressed by the general formulas (1) to (3) at least one of the substituents $R^1$, $R^2$, $R^3$, $R^4$, $R^5$ and $R^6$ is a group that can form, in a molecule or between molecules, a hydrogen bond together with oxygens of a carbonyl group.

By adopting such a constitution, the respective molecules are arranged harmoniously in a crystal. As a result, a network structure is formed and every molecular charge transfer axis is aligned, thus obtaining a still greater non-linear optical characteristics.

Additionally, in these tertiary non-linear optical materials, it is desirable that each pair of the substituents; $R^1$ and $R^4$; $R^2$ and $R^5$; and $R^3$ and $R^6$ is respectively the same groups in the naphthoquinone derivative expressed by the formula (2).

By adopting such a constitution, a naphthoquinone derivative with high symmetricity in a molecular structure can, although its excitation level to allow transition is reduced, increase the individual molecular transition moment, resulting in a larger non-linear optical characteristics.

BRIEF DESCRIPTION OF DRAWINGS

FIG. 1 is a schematic diagram illustrating a molecular structure of BAHNQ of Example 1 among tertiary non-linear optical materials of the present invention.

BEST MODE FOR CARRYING OUT THE INVENTION

Figure 2:
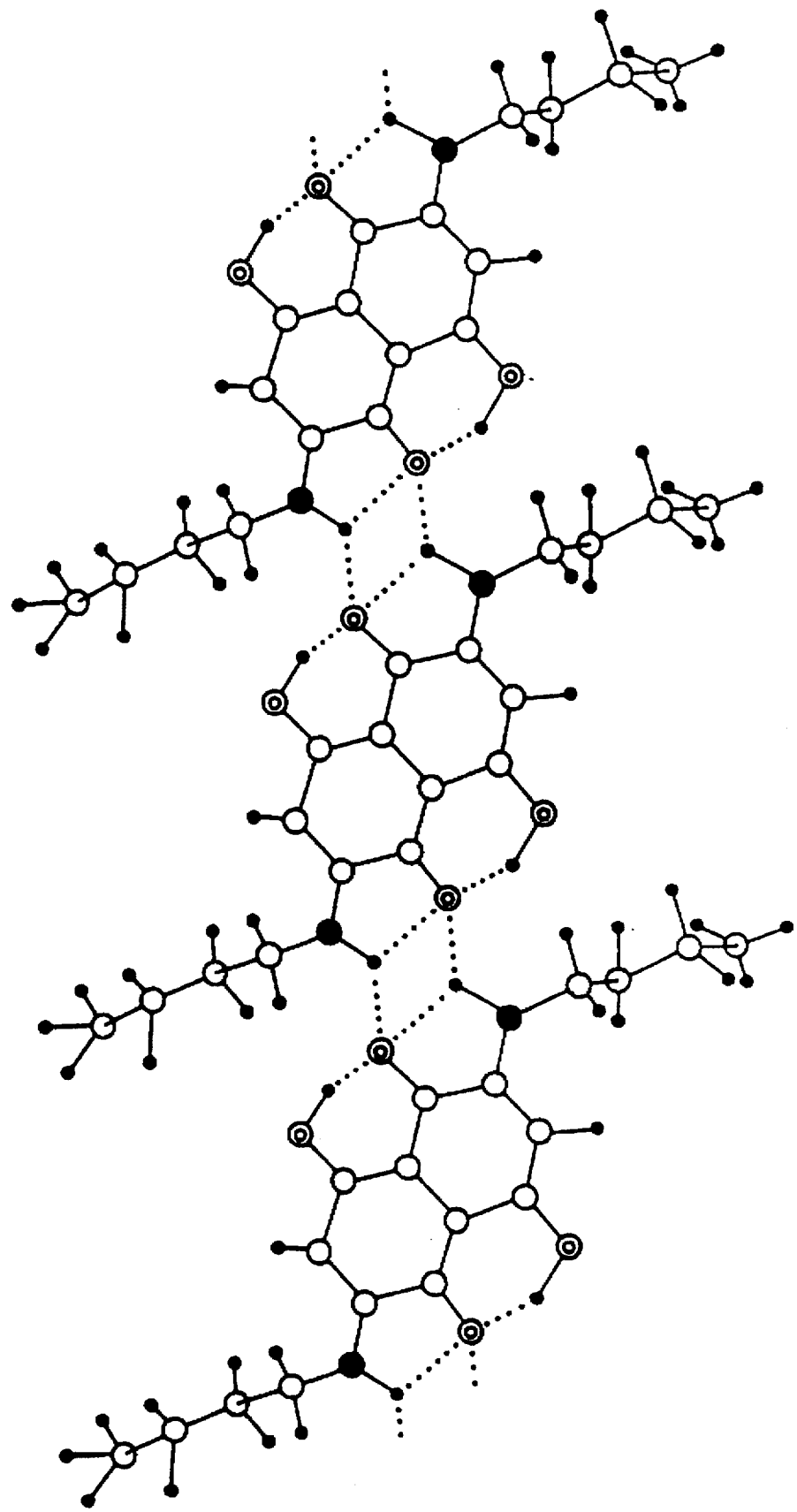
FIG. 2 is a schematic diagram illustrating a hydrogen bond structure formed in a molecule or between molecules of BAHNQ.

In the tertiary non-linear optical materials of the present invention, the electron-donating group corresponding to $R^1$ in the substituents of the quinone derivatives expressed by the general formulas (1) to (3) includes alkyl groups such as methyl, ethyl, propyl, isopropyl, butyl, isobutyl, tert-butyl, pentyl, hexyl, heptyl, octyl, nonyl, decyl, undecyl, dodecyl, tridecyl, tetradecyl, pentadecyl; hydroxyl groups; hydroxyalkyl groups such as methylol, 2-hydroxyethyl, 3-hydroxypropyl; alkoxyl groups such as methoxy, ethoxy, propoxy, isopropoxy, butoxy, isobutoxy, tert-butoxy, pentyloxy, hexyloxy, heptyloxy, octyloxy, nonyloxy, decyloxy, undecyloxy, dodecyloxy, tridecyloxy, tetradecyloxy, pentadecyloxy; mercapto group; alkylthio groups such as methylthio, ethylthio, propylthio, butylthio, hexylthio, octylthio; aralkylthio or arylthio groups optionally containing a substituent such as benzylthio, phenylthio, p-phenylthio; amino groups optionally containing an alkyl group such as amino, methylamino, ethylamino, propylamino, isopropylamino, butylamino, hexylamino, dimethylamino, methylethylamino, diethylamino, dipropylamino, dibutylamino; aralkylamino groups such as benzylamino, benzhydrylamino, tritylamino; arylamino groups such as phenylamino; phenyl groups substituted with halogen atoms such as fluorine, chlorine, bromine, iodine, or a derivative thereof, among others.

The substituents $R^2$, $R^3$, $R^4$, $R^5$ and $R^6$ include the above electron-donating groups and hydrogen atom, and further include other organic substituents.

The above organic substituents include acryl groups such as formyl, acetyl, propionyl, butyryl, pentanoyl, hexanoyl, octanoyl, benzoyl; carbamoyl groups optionally containing a substituent such as carbamoyl, methylcarbamoyl, dimethylcarbamoyl, ethylcarbamoyl, propylcarbamoyl, hexylcarbamoyl, laurylcarbamoyl, benzylcarbamoyl, phenylcarbamoyl; carboxy groups; esterified carboxy groups such as alkoxycarbonyl group (e.g. methoxycarbonyl, ethoxycarbonyl, propoxycarbonyl, pentyloxycarbonyl, hexyloxycarbonyl), aryloxycarbonyl group optionally containing a substituent (e.g. phenoxycarbonylt p-nitrophenyloxycarbonyl), aralkyloxycarbonyl group (e.g. benzyloxycarbonyl, benzhydryloxycarbonyl); alkanesulfonyl groups optionally containing a halogen atom, such as methanesulfonyl, ethanesulfonyl, propanesulfonyl, butanesulfonyl, trifluoromethanesulfonyl, 2,2,2-trifluoroethanesulfonyl; acylamino groups such as formamide, acetamide, propionamide, butyrylamino, hexanoylamino, benzoylamino; cyano groups; nitro groups; nitroso groups; sulfo groups; esterified sulfo groups such as alkoxysulfonyl group (e.g. methoxysulfonyl, ethoxysulfonyl, propoxysulfonyl, butoxysulfonyl, pentyloxysulfonyl, hexyloxysulfoxy, octyloxysulfonyl), phenoxysulfonyl group optionally containing a substituent (e.g. phenoxysulfonyl, p-cyanophenoxysulfonyl); sulfamoyl groups optionally containing a substituent, such as sulfamoyl, methylsulfamoyl, ethylsulfamoyl, phenylsulfamoyl, benzylsulfamoyl; thiocarboxy groups; quaternary ammonium salts such as tetramethylammonio, ethyltrimethylammonio; halogen atoms (e.g. fluorine, chlorine, bromine, iodine).

As described above, it is desirable that at least one of the substituents $R^1$, $R^2$, $R^3$, $R^4$, $R^5$ and $R^6$ in the quinone derivative expressed by the general formulas (1) to (3) is a group capable of forming, in a molecule or between molecules, a hydrogen bond together with oxygens of a carbonyl group.

As an example of the naphthoquinone derivative of the general formula (1), consider a compound wherein the substituents $R^2$ to $R^6$ are all hydrogen atoms and the substituent $R^1$ is a group of —R—H capable of forming a hydrogen bond together with oxygens of a carbonyl group in a molecule or between molecules.

In a crystal, a hydrogen atom of the group of —R—H forms a hydrogen bond together with oxygens of the carbonyl group between molecules, as shown by "..." in the formula (5), so that the respective molecules are arranged harmoniously. As a result, a network structure is formed and every molecular charge transfer axis is aligned, thus obtaining a still greater non-linear optical characteristics.

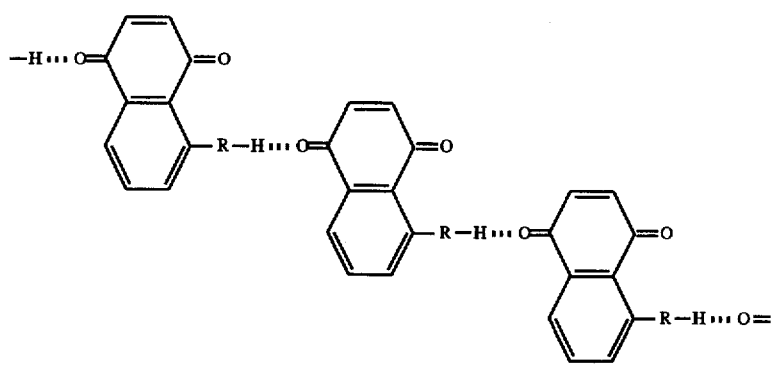

(5)

Examples of a group capable of forming a hydrogen bond together with oxygens of a carbonyl group in a molecule or between molecules include the groups as previously mentioned, i.e. hydroxyl groups; hydroxyalkyl groups such as methylol, 2-hydroxyethyl, 3-hydroxypropyl; alkylthiol groups such as thiol, methanethiol, ethanethiol, propanethiol; amino groups optionally containing an alkyl group, such as amino, methylamino, ethylamino, propylamino, isopropylamino, butylamino, hexylamino, dimethylamino, methylethylamino, diethylamino, dipropylamino, dibutylamino; aralkylamino groups such as benzylamino, benzhydrylamino, tritylamino; arylamino groups such as phenylamino.

The tertiary non-linear susceptibility $X^{(3)}$ for the tertiary non-linear optical materials of the present invention results from the inner-molecular charge transfer structure composed of electron-donating groups and electron-accepting groups, as described above. Therefore, it is undesirable that every substituent $R^1$, $R^2$, $R^3$, $R^4$, $R^5$ or $R^6$ in the general formulas (1) to (3) is a larger group. Relatively a smaller group selected from the above mentioned groups is more favorable for obtaining a larger value of $X^{(3)}$. For the same reason, it is desirable that both an electron-donating group corresponding to the substituent $R^1$ and an electron-donating group selected from the substituents $R^2$, $R^3$, $R^4$, $R^5$ and $R^6$ have a stronger electron-donating properties.

In the naphthoquinone derivative expressed by the general formula (2), it is desired that each pair of the substituents: $R^1$ and $R^4$; $R^2$ and $R^5$; and $R^3$ and $R^6$ is respectively the same groups, that the pair of $R^1$ and $R^4$ is selected from the above electron-donating groups, and that the pairs: $R^2$ and $R^5$; and $R^3$ and $R^6$ are respectively selected from the groups containing hydrogen atoms, electron-donating groups and the above mentioned organic substituents.

The anthraquinone derivative expressed by the formula (4) generates no second harmonic in contrast with the derivative expressed by the general formula (1), and exhibits a higher efficiency of third harmonic generation, thus being an excellent material like the quinone derivatives of the general formulas (1) to (3).

Japanese Patent Unexamined Publication No. 2-63025 discloses an anthraquinone material expressed by the general formula:

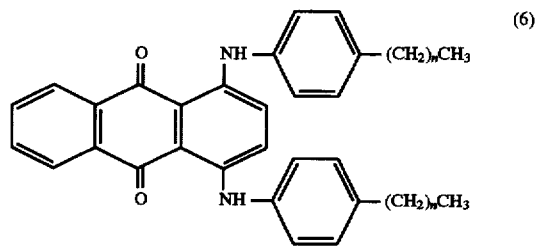

wherein n is 0 or a positive integer, which is similar to the anthraquinone derivative of the formula (4). This material, however, generates a second harmonic along with a third harmonic. Accordingly, it lacks reliability of its behavior when acting as a device. That is, the efficiency of third harmonic generation for this material becomes unstable due to a mingled second harmonic, thus being unsuitable for a wave converting device. Consequently, the anthraquinone material of the formula (6) can not be used as a tertiary non-linear optical material.

The tertiary non-linear optical materials of the present invention, each being the quinone derivative, can be used in various situations: where it is included in a host lattice, e.g. polymer, clathrate compound (inclusion compound), solid solution, liquid crystal; where it is in a thin layer deposited on a substrate (a monomolecular layer of Langmuir-Blodgett); or in various forms: a single crystal, powder, a deposited film, a solution and the like.

Since the tertiary non-linear optical materials have a higher tertiary non-linear optical effect, they can be suitably used for an optical modulation device such as a phase modulation device, a phase conjugation optical device, an amplitude modulation device, a frequency modulation device, a pulse modulation device, a polarization modulation device; an optical bistable device such as an optical memory device, an optical pulse waveform-control device, an optical limiter, a differentiating amplifier, an optical transistor, an A/D conversion device, an optical logic device, an optical multivibrator, an optical flip-flop circuit; a third harmonic generation device, among others.

In the present invention, if each non-linear optical material is in crystal form, it can be used for the above mentioned devices as it is.

Further, by forming a waveguide type device thereto, light can be shut up in the waveguide. This increases optical power density as well as interaction length, thereby making it possible to decrease operation power of the device.

When forming the waveguide, it is necessary to make the tertiary optical material into a thin film on a waveguide substrate of an isotropic medium or between the substrates. Such a thin film can be formed in crystal or amorphous state.

In the present invention, crystallization is preferred for exhibiting a maximal non-linearity.

For making the non-linear optical material into a thin film by growing it on a waveguide substrate or between the substrates, the following methods can be employed:

- melting this material by heating and slowly cooling to deposit a crystal;
- dissolving this material in an appropriate organic solvent to prepare a solution, then allowing this solution to be evaporated to deposit a crystal; and
- depositing a crystal over a substrate by vacuum deposition, high-frequency sputtering or the like.

In other cases, a crystal of the non-linear optical material may be grown by the above method after treating the surface of a substrate with an orientation treatment agent. Examples of the orientation treatment agent include inorganic or organic salts (e.g. hexadecyltrimethylammonium bromide), thin films of a suitable polymer (e.g. polyamide), metal complexes, metal thin films (e.g. oblique-deposited metal thin film), among others.

Instead of the above orientation treatment, a substrate of which surface is provided with a grating can be employed. The grating can be formed by rubbing, or by air-phase or liquid-phase etching using a mask formed by photolithography. Alternatively, it can be formed by providing a thin layer over a substrate by Langmuir-Blodgett technique.

The non-linear optical device wherein the tertiary non-linear optical materials of the present invention are used for an optical waveguide is not limited to the above examples. Various modification can be made, for example, an optical modulation device may be substituted for a side-pumped working optical waveguide modulation device that allows an amplitude modulation. It may also take a methodwherein voltage is directly applied to a non-linear medium such as a crystal.

In an optical modulation device, the direction of applying an electric field for efficient phase modulation varies depending upon symmetry of a non-linear medium, the direction of a crystal axis or the like. Therefore, based on such data, it is desired to appropriately change the electrode constitution.

FIELD OF INDUSTRIAL APPLICABILITY

As described above, the tertiary non-linear optical materials of the present invention whose large tertiary susceptibility is compatible with high speed of response, can be suitably employed for various non-linear optical devices utilizing the tertiary optical effect.

EXAMPLES

The following will explain in more detail the present invention with reference to Examples, which are merely shown by way of example.

Example 1

20 G of 1,5-dinitronaphthalene was added to 400 g of 100% sulfuric acid, to which a solution prepared by dissolving 10 g of sulfur in 100 g of fuming nitric acid was gradually added dropwise while maintaining a liquid temperature of the resulting solution in a range from 30° C. to 45° C. with stirring. The resulting mixture was stirred keeping the same range of liquid temperature for 2 hours, and the reaction solution was poured into 1 liter of ice water to deposit a solid. The solid was filtered off, while the resulting filtrate was concentrated using a rotary evaporator until its volume was brought to 100 ml, followed by air-cooling to deposit a solid reaction product.

An identification of compound for this reaction product was conducted by nuclear magnetic resonance (NMR), infrared spectroscopic analysis (IR), elemental analysis and mass spectrometry. Then, the product was identified as a naphthazarin expressed by the formula:

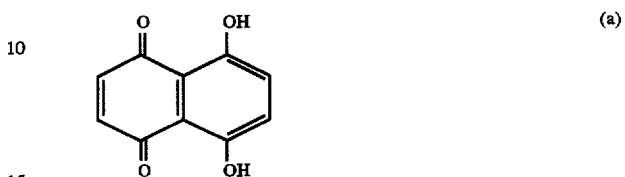

Then, 10 G of the naphthazarin thus obtained was dissolved in 100 ml of ethanol, to which 30 g of copper acetate was added with stirring. The mixture was allowed to stand upon cooling for twenty-four hours to deposit a solid reaction product.

In the same manner as mentioned above, an identification of this compound was conducted for this reaction product. As a result, the product was identified as a naphthazarin-copper complex expressed by the formula:

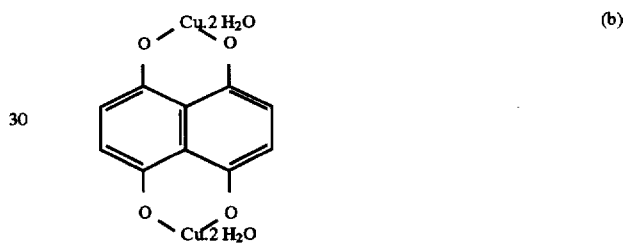

Further, 10 g of the above naphthazarin-copper complex was dissolved in 30 mi of n-butanol and then gradually added dropwise with 80 ml of n-butylamine under icecooling. After raising a liquid temperature to 50 ° C., the mixture was reacted with stirring for twenty-four hours. Thereafter, the n-butanol was distilled away to give a solid. The solid was separated and purified by silica gel column chromatography using chloroform as a developing solvent, then allowed to recrystallize out of an acetonitrile to give a crystal having metallic luster.

In the same manner as mentioned above, an identification of compound was conducted for this reaction product. As a result, the product was identified as a 2,6-di-n-butylamino-4,8-dihydroxy-1,5-naphthoquinone (hereinafter referred to as "BAHNQ") expressed by the formula:

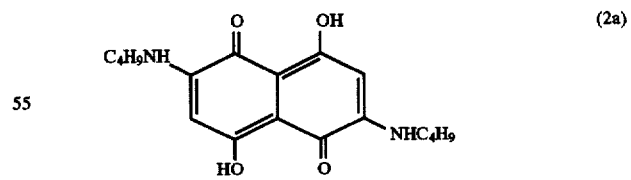

Example 2

10 G of quinizarin was dissolved in 30 ml of n-butanol and gradually added dropwise with 100 ml of cyclohexylamine at room temperature. After raising a liquid temperature to 50 ° C., the mixture was reacted with stirring for twenty-four hours. Thereafter, the n-butanol was distilled away to give a solid. The solid was separated and purified by silica gel column chromatography using chloroform as a developing solvent, then allowed to recrystallize out of an acetonitrile to give a crystal.

The crystal was analyzed by the above NMR, IR, elemental analysis and mass spectrometry. As a result, it was identified as a 1,4-dicyclohexylamino-9,10-anthraquinone (hereinafter referred to as "CHAAQ") expressed by the formula:

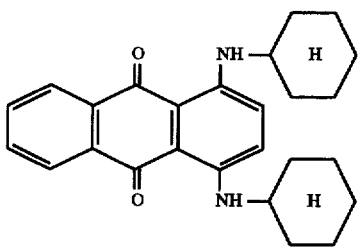

(4)

Example 3

10 G of quinizarin was dissolved in 60 ml of n-octanol and gradually added dropwise with 60 ml of n-octylamine at room temperature. After raising a liquid temperature to 100° C., the mixture was reacted with stirring for twenty-four hours. Thereafter, the n-octanol was distilled away to give a solid. The solid was separated and purified by silica gel column chromatography using chloroform as a developing solvent, then allowed to recrystallize out of an acetonitrile to give a crystal.

The crystal was analyzed by the above NMR, IR, elemental analysis and mass spectrometry. As a result, it was identified as a 2-n-octylamino-4,9-dihydroxy-1,10-anthraquinone (hereinafter referred to as "OAHAQ") expressed by the formula:

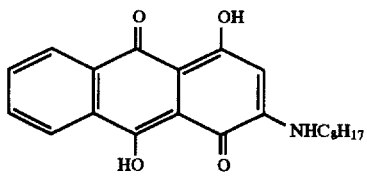

(3a)

Example 4

20 G of 2,3-dichloro-1,4-naphthoquinone was dissolved in 100 ml of concentrated sulfuric acid under ice-cooling and gradually added dropwise with 20 ml of fuming nitric acid with stirring. The mixture was reacted with stirring for another 5 hours. Thereafter, the reaction solution was poured into 500 ml of ice water to deposit a solid. The solid was filtered off, separated and purified by silica gel column chromatography using dichloromethane as a developing solvent to give a nitro compound expressed by the formula:

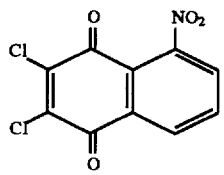

(c)

10 g of the nitro compound, 5 g of copper cyanide and 10 g of sodium cyanide were added to 100 ml of N,N-dimethylformamide. The mixture was reacted at 160 ° C. with stirring for twenty-four hours. Thereafter, the reaction solution was poured into 1000 ml of ice water to deposit a solid. The solid was filtered off, separated and purified by silica gel column chromatography using dichloromethane as a developing solvent to give a dicyano compound expressed by the formula:

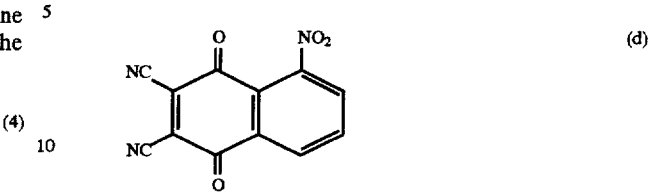

(d)

5 G of the dicyano compound was dissolved in 500 ml of ethanol, to which 2 g of palladium carbon was added under a hydrogen atmosphere. The mixture was reacted with stirring for twenty-four hours. Thereafter, the dicyano compound was distilled off to give a solid. The solid was separated and purifiea by silica gel column chromatography using dichloromethane as a developing solvent, then allowed to recrystallize out of an acetonitrile to give a crystal.

The crystal was analyzed by the above NMR, IR, elemental analysis and mass spectrometry. As a result, it was identified as a 5-amino-2,3-dicyano-1,4-naphthoquinone (hereinafter referred to as "ADCNQ") expressed by the formula:

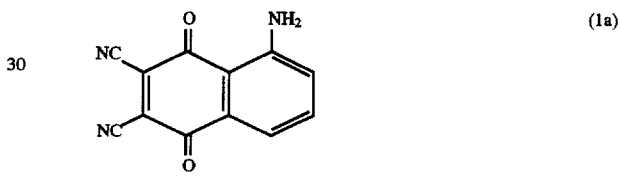

(1a)

Evaluation Test 1

Using the compounds obtained in Examples 1 to 4, four thin films were formed on a quartz substrate by vacuum deposition. A THG strength of third harmonic was measured by the following Maker Fringe method. Then, the value of $X^{(3)}_{THG}$ was calculated by comparing the value of THG strength thus obtained and that of THG strength of quartz glass as a standard sample.

Measurement of THG Strength (Maker Fringe Method)

Light (wavelength: 1.5 μm, 1.7 μm, 1.9 μm and 2.1 μm) was obtained by difference frequency occurred between an Nd:YAG laser fundamental wave and a pigment laser.

The above light was respectively irradiated to each thin film of the four compounds. There was measured the fringe pattern which was caused by third harmonic of a wavelength ranging from 0.5μm to 0.7 μm that generates from the thin film, thereby determining THG strength.

Evaluation Test 2

Each compound powder of Examples 1 to 4 was packed in a glass cell.

A SHG strength of second harmonic for each powder was measured, according to the method described in S. K. Kurtz, T. T. Perry, J. Apply. Phys., 39 3798 (1968), as follows.

Measurement of SHG Strength

Light having a wavelength of 1.9 μm which was obtained by difference frequency occurred between an Nd:YAG laser fundamental wave and a pigment laser, was irradiated to each glass cell packed with the powder of the four compounds.

Using a photomultiplier tube, there was measured a SHG strength for second harmonic of a wavelength of 0.95 μm that generates from the cell.

Table 1 shows the results of the evaluation tests.

TABLE 1

| | $X^{(3)}_{THG} \times 10^{12}$ (esu) Excitation wavelength (μm) | | | | SHG strength |
|---|---|---|---|---|---|
| | 1.5 | 1.7 | 1.9 | 2.1 | |
| Example 1 | 39 | 18 | 48 | 1.3 | Not generated |
| Example 2 | 5.7 | 3.9 | 2.6 | 1.6 | Not generated |
| Example 3 | — | — | 0.6 | — | Not generated |
| Example 4 | 2.8 | 3.0 | 2.8 | 1.4 | Not generated |

Followings are noted by inspection of Table 1.

The values of $X^{(3)}_{THG}$ for Examples 1 through 4 are more than $10^{-13}$ esu, thus having a large tertiary non-linear susceptibility.

Every compound generates no second harmonic, as seen from the results of SHG strength measurement. This shows that the value of $X^{(3)}_{THG}$ is independent of a cascade process of second harmonic.

Most outstanding of those is Example 1 because its BAHNQ exhibits a remarkable large value of $4.8 \times 10^{-11}$ esu for the excitation wavelength of 1.9 μm. Thus, Example 1 is a compound of great practical value as a tertiary non-linear optical material.

As seen from the formula (2a), the BAHNQ has a highly symmetric molecular structure. Thus, it is considered that an increase in the individual molecular transition moment causes a larger non-linear optical characteristics.

Moreover, the BAHNQ was dissolved in acetonitrile. The solution was evaporated to give a crystal. Then, the crystal structure was analyzed by X-ray diffraction.

In FIG. 1, the distance between an oxygen $O^1$ of carbonyl groups and a hydrogen $H^4$ of hydroxyl groups is 1.348 Å, while that of the oxygen $O^1$ and a hydrogen $H^6$ of amino groups of other adjacent molecules is 1.959 Å. This shows that the BAHNQ forms inner/inter molecular hydrogen bonds in the crystal, as illustrated by "..." in FIG. 2.

From these findings, it can presume that in the BAHNQ the respective molecules are arranged harmoniously in a crystal, and every molecular charge transfer axis is aligned as illustrated in FIG. 2. This fact seems to be another cause of a larger non-linear optical characteristics.

In FIG. 1, symbols $C^1$ to $C^{18}$ are carbon atoms constituting the molecules of the BAHNQ, $H^1$ to $H^{24}$ are hydrogen atoms, $O^1$ to $O^4$ are oxygen atoms and $N^1$ and $N^2$ are nitrogen atoms.

In FIG. 2, symbols "○", "•", "⊙" and "●" denote a carbon atom, a hydrogen atom, an oxygen atom and a nitrogen atom, respectively.

We claim:

1. A tertiary non-linear optical material which is a crystal or an amorphous quinone derivative expressed by any one of the general formulas:

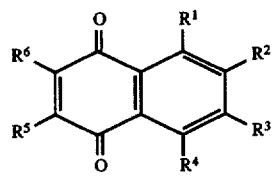

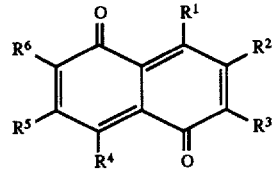

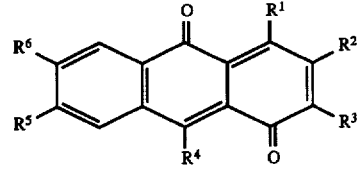

wherein $R^1$ is an electron-donating group; $R^2$, $R^3$, $R^4$, $R^5$ and $R^6$ are the same or different, and are a hydrogen atom or an organic substituent containing the electron-donating group, or the formula:

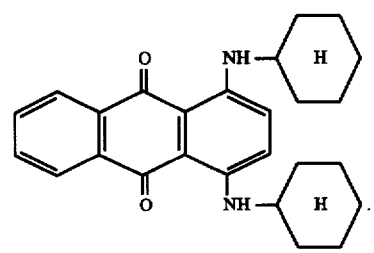

2. A tertiary non-linear optical material according to claim 1, wherein at least one of the substituents $R^1$, $R^2$, $R^3$, $R^4$, $R^5$ and $R^6$ in the formulas being a group capable of forming a hydrogen bond together with oxygens of a carbonyl group in a molecule or between molecules.

3. A tertiary non-linear optical material according to claim 1, wherein the quinone derivative is expressed by the general formula (2), and a pair of the substituents: $R^1$ and $R^4$; $R^2$ and $R^5$; $R^3$ and $R^6$, each being the same groups.

4. A tertiary non-linear optical material according to claim 1, wherein the quinone derivative is 2,6-di-n-buthylamino-4,8-dihydroxy-1,5-naphthoquinone expressed by formula:

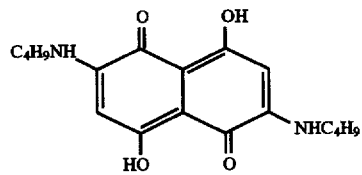

5. A tertiary non-linear optical material according to claim 1, wherein the quirtone derivative is 1,4-dicyclohexylamino-9,10-anthraquinone expressed by formula:

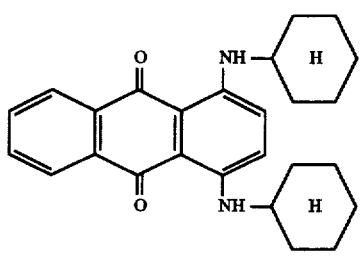 (4)

6. A tertiary non-linear optical material according to claim 1, wherein quinone derivative is 2-n-octylamino-4 9-dihydroxy-1,10-anthraquinone expressed by formula:

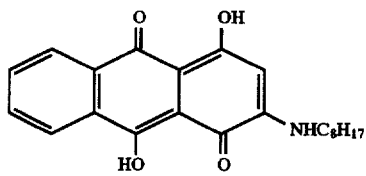 (3a)

7. A tertiary non-linear optical material according to claim 1, wherein the quinone derivative is 5-amino-2,3-dicyano-1,4-naphthoquinone expressed by formula:

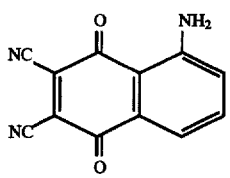 (1a)

* * * * *